United States Patent
Roberge et al.

(10) Patent No.: US 10,219,426 B2
(45) Date of Patent: *Mar. 5, 2019

(54) SEED DEFLECTOR AND AGITATOR FOR AN AGRICULTURAL PRODUCT DISTRIBUTION SYSTEM

(71) Applicant: CNH Industrial Canada, Ltd., Saskatoon (CA)

(72) Inventors: Martin J. Roberge, Saskatoon (CA); Darwin L. Zacharias, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,104

(22) Filed: Jan. 18, 2018

(65) Prior Publication Data

US 2018/0141763 A1 May 24, 2018

Related U.S. Application Data

(62) Division of application No. 14/932,082, filed on Nov. 4, 2015, now Pat. No. 9,908,720.

(60) Provisional application No. 62/074,837, filed on Nov. 4, 2014.

(51) Int. Cl.
  *B65G 53/34* (2006.01)
  *B65G 53/46* (2006.01)
  *B65G 53/66* (2006.01)
  *A01C 7/08* (2006.01)

(52) U.S. Cl.
  CPC .............. *A01C 7/084* (2013.01); *A01C 7/081* (2013.01); *B65G 53/34* (2013.01); *B65G 53/66* (2013.01); *B65G 53/4633* (2013.01)

(58) Field of Classification Search
  CPC .... B65G 53/34; B65G 53/00; B65G 53/4633; B65G 53/4625; B65G 53/4608; B65G 53/46; B65G 53/40; B65G 53/66; A01C 7/081; A01C 7/08; A01C 7/00; A01C 7/084
  See application file for complete search history.

(56) References Cited

U.S. PATENT DOCUMENTS

| | | |
|---|---|---|
| 3,122,283 A | 2/1964 | Walters |
| 3,189,230 A | 6/1965 | Gillespie |
| 3,976,030 A | 8/1976 | Ragsdale et al. |
| 4,010,778 A | 3/1977 | Aggen et al. |
| 4,159,064 A | 6/1979 | Hood et al. |
| 4,450,979 A | 5/1984 | Deckler |
| 4,503,803 A | 3/1985 | Barnes |
| 5,592,889 A | 1/1997 | Bourgault |
| 5,915,312 A | 6/1999 | Meyer et al. |
| 5,980,163 A | 11/1999 | Gregor et al. |
| 6,274,190 B1 | 8/2001 | Long, Jr. et al. |
| 6,298,797 B1 | 10/2001 | Mayerle et al. |
| 6,499,413 B2 | 12/2002 | Kleinknecht et al. |

(Continued)

*Primary Examiner* — Christopher J. Novosad
(74) *Attorney, Agent, or Firm* — Rebecca L. Henkel; Rickard K. DeMille

(57) ABSTRACT

A seed planting system includes a seed storage tank to store seeds. A seed meter is fluidly coupled to the seed storage tank via a flow path, in which the seed meter receives seeds from the seed storage tank and distributes the seeds to ground engaging opener assemblies. A seed deflector is coupled to the seed storage tank directly above the flow path. The seed deflector guides the seeds from the seed storage tank into the flow path at an angle relative to a vertical axis of the flow path.

5 Claims, 9 Drawing Sheets

(56) References Cited

U.S. PATENT DOCUMENTS

| | | |
|---|---|---|
| 6,520,111 B2 | 2/2003 | Lang |
| 6,688,244 B1 | 2/2004 | Meyer et al. |
| 6,935,256 B1 | 8/2005 | Meyer et al. |
| 7,104,207 B2 | 9/2006 | Wake et al. |
| 7,213,525 B2 | 5/2007 | Meyer et al. |
| 7,765,943 B2 | 8/2010 | Landphair et al. |
| 8,001,915 B2 | 8/2011 | Friggstad |
| 8,371,238 B2 | 2/2013 | Dean et al. |
| 8,672,173 B2 | 3/2014 | Hat et al. |
| 8,683,930 B2 | 4/2014 | Cresswell et al. |
| 8,701,575 B2 | 4/2014 | Friggstad |
| 8,714,344 B2 | 5/2014 | Kowalchuk et al. |
| 8,733,257 B2 | 5/2014 | Beaujot et al. |
| 8,800,458 B1 | 8/2014 | Wilhelmi et al. |
| 2006/0120836 A1 | 6/2006 | Cresswell et al. |
| 2012/0174844 A1 | 7/2012 | Friggstad |
| 2012/0298022 A1 | 11/2012 | Bowen |
| 2013/0247803 A1 | 9/2013 | Heintzman |
| 2014/0190584 A1 | 7/2014 | Johnson et al. |
| 2014/0208999 A1 | 7/2014 | Henry |

SEED DEFLECTOR AND AGITATOR FOR AN AGRICULTURAL PRODUCT DISTRIBUTION SYSTEM

CROSS-REFERENCE TO RELATED APPLICATION

This application claims priority and benefit from U.S. patent application Ser. No. 14/932,082, entitled "SEED DEFLECTOR AND AGITATOR FOR AN AGRICULTURAL PRODUCT DISTRIBUTION SYSTEM", filed Nov. 4, 2015, which claims priority and the benefit of U.S. Provisional Application Ser. No. 62/074,837, entitled "SEED DEFLECTOR AND AGITATOR FOR AN AGRICULTURAL PRODUCT DISTRIBUTION SYSTEM", filed Nov. 4, 2014, both of which are hereby incorporated by reference in their entirety herein.

BACKGROUND

The present disclosure relates generally to seed planting systems and, more particularly, to seed distribution in the seed planting system.

Generally, a seed planting system is used to deposit seeds into soil. For example, in the seed planting system, an agricultural implement may include multiple rows of ground engaging opener assemblies that excavate trenches into the soil. The ground engaging opener assemblies may then deposit seeds into the excavated trenches. In this manner, rows of seeds may be planted into the soil.

To facilitate the deposition of seeds, the seeds may be distributed to each of the ground engaging opener assemblies from a centralized storage location, such as a seed storage tank. More specifically, a seed meter may be used to control the seed distribution to each of the ground engaging opener assemblies from the centralized storage location. In other words, the storage tank may supply seeds into the seed meter for distribution. As such, seed distribution may be undesirable when the flow of seeds from the storage tank to the seed meter is obstructed, for example, by clumped seeds.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes a seed planting system that includes a seed storage tank to store seeds; a seed meter fluidly coupled to the seed storage tank via a flow path, in which the seed meter receives seeds from the seed storage tank and distributes the seeds to ground engaging opener assemblies; and a seed deflector coupled to the seed storage tank directly above the flow path, in which the seed deflector guides the seeds from the seed storage tank into the flow path at an angle relative to a vertical axis of the flow path.

A second embodiment describes a method for controlling actuation of a seed deflector in a seed planting system. The method includes determining, using a control system, that clumped seeds are at least partially obstructing a flow path between a seed storage tank and a seed meter; instructing, using the control system, a motor drive to actuate the seed deflector to dislodge the clumped seeds, in which the seed deflector is positioned directly above the flow path; determining, using the control system, that a seed gate assembly disposed in the flow path is moving from an open position to a closed position; and instructing, using the control system, the motor drive to position the seed deflector in an upright orientation to establish a seed void above the seed gate assembly that facilitates moving the seed gate assembly to the closed position.

A third embodiment describes a seed planting system that includes a seed gate assembly disposed between a seed storage tank and a seed meter. The seed gate assembly includes a gate barrier that controls seed flow through a flow path from the seed storage tank into the seed meter by moving between an open position and a closed position; and a first seed agitator extending substantially perpendicularly from a surface of the gate barrier. The seed planting system further includes a seed deflector positioned directly above the flow path and coupled to the gate barrier by a cable, in which the cable actuates the seed deflector as the gate barrier moves. The seed deflector and the first seed agitator dislodge clumped seeds in the seed storage tank as the gate barrier moves from the open position toward the closed position.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
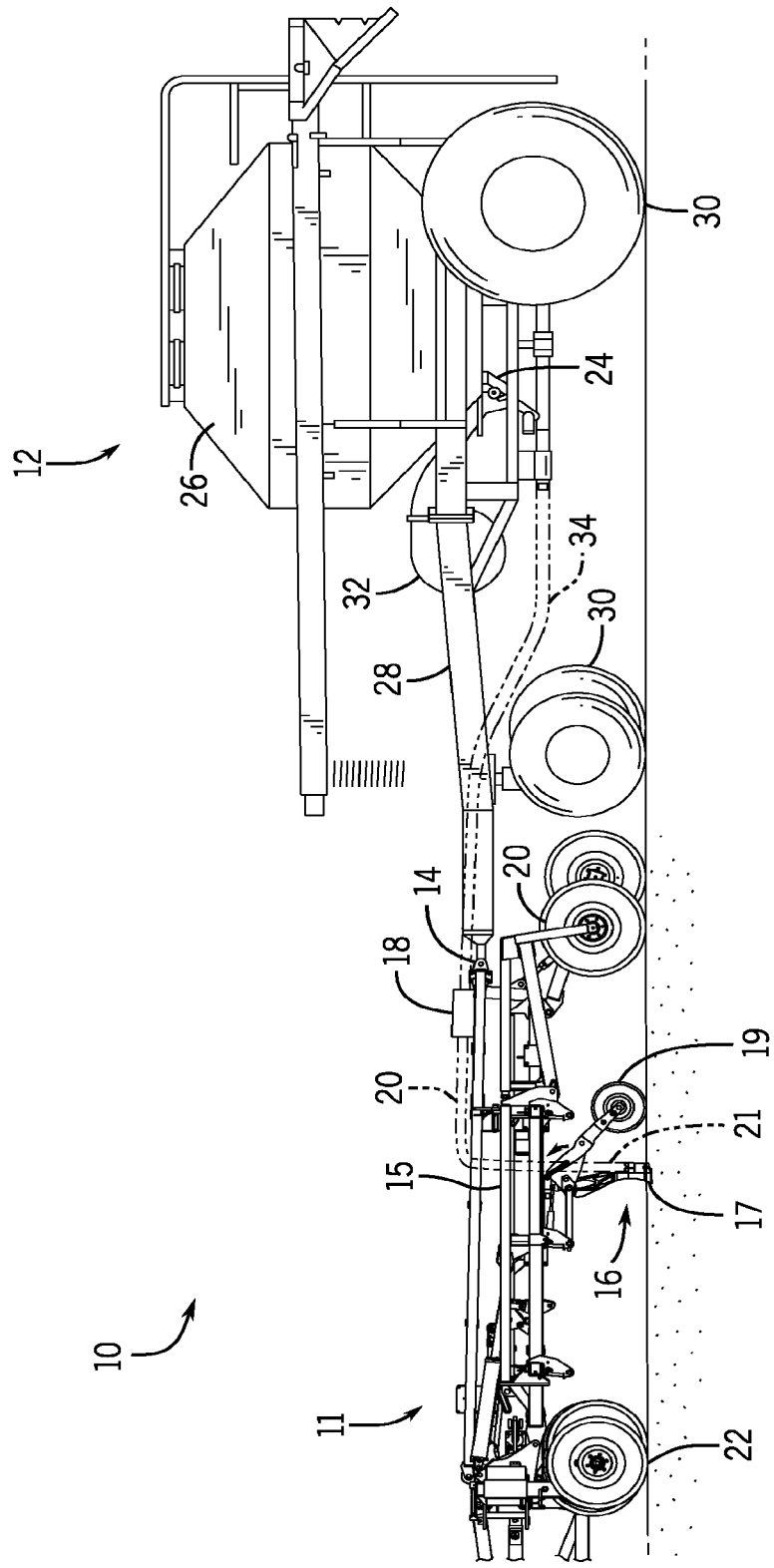
FIG. 1 is a side view of a seed planting system with an agricultural implement and an air cart, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

A planting system generally enables multiple rows of seeds to be deposited into soil. For example, the seeds may be distributed to multiple rows of ground engaging opener assemblies on an agricultural implement. Each of the ground engaging opener assemblies may engage the soil to excavate a trench and deposit the seeds into the trench.

In certain configurations, the ground engaging opener assemblies do not include adjustable control over the rate of seed deposition. Instead, each ground engaging opener assembly may receive seeds, e.g., via a pneumatic flow through hose, and utilize gravity to deposit received seeds into a trench. In other words, the ground engaging opener assembly may deposit seeds based on the flow rate of seeds to the ground engaging opener assembly, among other factors.

As such, the deposition of seeds may be controlled by the distribution of seeds to each of the ground engaging opener assemblies. In some embodiments, controlling the flow of seeds may enable the seed spacing and/or amount of seeds deposited to be controlled. For example, by decreasing the distribution rate of seeds to a ground engaging opener, the seed spacing may be increased and/or the amount of seeds deposited may be decreased. On the other hand, by increasing the distribution rate of seeds to a ground engaging opener, the seed spacing may be reduced and/or amount of seeds deposited may be increased.

Generally, the seeds may be stored in and distributed from a centralized location, such as an air cart. More specifically, on the air cart, a storage tank may centrally store the seeds and a seed meter may control the distribution of seeds to each of the ground engaging opener assemblies. Thus, the storage tank and the seed meter may be fluidly coupled to enable seed flow from the storage tank into the seed meter.

As such, the deposition of seeds may be affected when the seed flow from the storage tank into the seed meter is disturbed, for example, by an obstruction caused by clumped seeds in the storage tank. In some embodiments, seeds may clump due to their asymmetrical shapes, high-friction surfaces, close proximity, and/or "stickiness" due to natural fluids or treatments, among other factors. More specifically, clumped seeds may block seeds from flowing from the storage tank and into the seed meter, which reduces the amount of seed available for the seed meter to distribute. In other words, clumped seeds may cause the seed meter to distribute less than the desired amount of seeds to the ground engaging opener assemblies, thereby causing undesirable seed deposition.

Accordingly, as will be described in more detail below, the techniques described herein may improve the reliability of the seed distribution by reducing the possibility of seed clumping. In one embodiment, a seed meter is fluidly coupled to a storage tank to enable the storage tank to supply seeds to the seed meter. In other words, a flow path may be established between the storage tank and the seed meter to enable seed flow. To facilitate the seed flow, a seed deflector (e.g., an umbrella seed deflector) may be included directly above the flow path. More specifically, the umbrella seed deflector may guide the seeds so that the seeds enter the flow path at an angle relative to the vertical axis and are less concentrated (e.g., compacted) in the flow path, thereby reducing the possibility of clumped seed. In fact, in some embodiments, the umbrella seed deflector may actuate to agitate the seeds, which may further reduce the possibility of clumped seeds Additionally, in some embodiments, the seed meter may include a seed gate assembly, which may be used to control the seed flow from the storage tank into the seed meter. More specifically, the seed gate assembly may be opened to enable the seed flow and closed to block the seed flow. As the seed gate assembly closes, seeds in the path of the movement of the seed gate assembly may be displaced. However, this movement may be difficult when the seeds are tightly compacted against the seed gate assembly.

Accordingly, as will be described in more detail below, the techniques described herein may improve control over the seed flow by a seed gate assembly. In one embodiment, the umbrella seed deflector may establish a less concentrated flow of seeds through the flow path and against the seed gate assembly. As such, fewer seeds may be displaced as the seed gate assembly is closed, which may improve the ease and responsiveness of closing the seed gate assembly.

To help illustrate, a side view of a planting system 10 is shown in FIG. 1. As depicted, the planting system 10 includes an agricultural implement 11 coupled to an air cart 12. In the depicted embodiment, the air cart 12 is towed behind the agricultural implement 11. More specifically, the agricultural implement 11 may be coupled to an off-road work vehicle by a first hitch assembly (not shown), and the air cart 12 may be coupled to the agricultural implement 11 by a second hitch assembly 14. However, in other embodiments, the agricultural implement 11 may be towed behind the air cart 12. In further embodiments, the implement 11 and the air cart 12 may be part of a single unit that is towed behind an off-road work vehicle or may be elements of a self-propelled vehicle.

As described above, the agricultural implement 11 may be used to deposit rows of seeds into the soil as the agricultural implement 11 is towed across a field by an off-road work vehicle, such as a tractor. Accordingly, as depicted, the agricultural implement 11 includes a tool frame 15 coupled to a ground engaging opener assembly 16, a distribution header 18, a hose 20, and wheel assemblies 22.

More specifically, the wheel assemblies 22 may contact the soil surface to enable the agricultural implement 11 to be pulled by the off-road work vehicle. As the agricultural implement 11 is pulled, a row of seeds may be deposited into the soil by the ground engaging opener assembly 16. Although only one ground engaging opener assembly 16 is shown, the agricultural implement 11 may include multiple ground engaging opener assemblies 16 organized in a row across the agricultural implement 11. In some embodiments, the agricultural implement 11 may include a row of 12, 14, 16, 18, 20, or more ground engaging opener assemblies 16, which may each deposit a row of seeds.

To facilitate depositing seeds, each ground engaging opener assembly 16 includes an opener 17, a press wheel 19, and a seed tube 21. More specifically, when the opener 17 engages the soil, the opener 17 may exert a downward force that excavates a trench into the soil as the ground engaging opener assembly 16 travels through the field. Seeds may then be deposited into the excavated trench via the seed tube 21. Then, the press wheel 19 may move the excavated soil into the trench to cover the seeds.

As described above, the air cart 12 may centrally store seeds and distribute the seeds to the ground engaging opener assembly 16. Accordingly, as depicted, the air cart 12 includes a seed meter 24, a storage tank 26, a frame 28, wheels 30, and an air source 32. In the depicted embodiment, the air cart frame 28 is coupled to the tool frame 15 via the hitch 14. As such, the wheels 30 may contact the soil surface to enable the air cart 12 to be towed along with the agricultural implement 11.

Additionally, the storage tank 26 may centrally store the seeds for distribution. In some embodiments, the storage tank 26 may include multiple compartments for storing different types of granular products. For example, a first compartment may store seeds while a second compartment may store a dry fertilizer. In such configurations, the air cart 12 may deliver both seed and fertilizer to the implement 10 via separate distribution systems, or as a mixture through a single distribution system.

Generally, the distribution system may control the amount of seeds distributed to the ground engaging opener assemblies 16, for example, using the seed meter 24. As depicted, the seed meter 24 is mounted to the bottom of the storage tank 26, which may enable the storage tank 26 to supply seeds to the seed meter 24. The seed meter 24 may then distribute the seeds to the distribution header 18 via a respective hose 34. The distribution headers 18 may then distribute the seeds to one or more ground engaging opener assemblies 16 via the hose 20. In this manner, the seed meter 24 may control distribution of seeds from the storage tank 26 to the ground engaging opener assemblies 16 and into the trenches.

Figure 2:
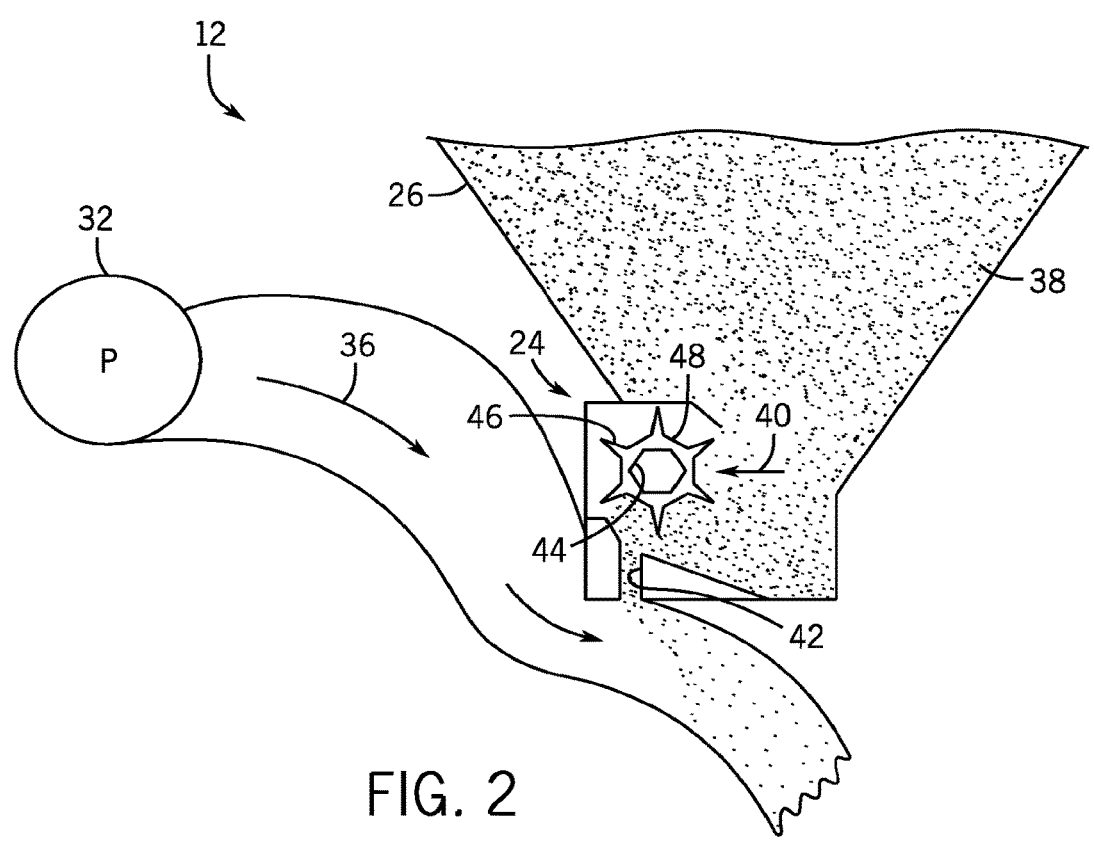
FIG. 2 is a schematic view of a seed meter, in accordance with an embodiment.

In some embodiments, the seeds may be pneumatically distributed. To help illustrate, a schematic view of the seed meter 24 and the storage tank 26 is shown in FIG. 2. As depicted, the air source 32 generates an air stream 36, which is guided through though the seed meter 24. In some embodiments, the air source 32 may be a pump or blower powered by an electric or hydraulic motor, for example. As depicted, the air stream 36 is guided so that it tangentially engages seeds 38 output from the storage tank 26. In this manner, the seeds 38 may be entrained in the air stream 36 and output from the seed meter 24.

Thus, the seed meter 24 may control the flow rate of seeds 38 by controlling the flow of seeds from the storage tank 26 into the air stream 36. In the depicted embodiment, a meter roller 40 is utilized. More specifically, rotation of the meter roller 40 may transfer seeds 38 through an opening 42 into the air stream 36. Thus, as depicted, the meter roller 40 includes an interior cavity 44 that receives a shaft connected to a drive unit, which actuates the meter roller 40. In other embodiments, the meter roller 40 may be coupled to a wheel 30 so that rotation of the wheel 30 drives the meter roller 40 to rotate. Such a configuration may automatically vary the rotation rate of the meter roller 40 based on the speed of the air cart 12.

Additionally, as depicted, the meter roller 40 includes multiple flutes 46 and recesses 48. More specifically, seeds 28 may be held between adjacent flutes 46 in each recess 48. Thus, as the meter roller 40 rotates, gravity may pull the seeds 38 held in a recess 48 through the opening 42 and into the air stream 36. Generally, the number and geometry of the flutes 46 may be based on the seeds 38 being distributed. For example, a meter roller 40 having deeper recesses 48 and fewer flutes 46 may be employed for larger seeds, while a meter roller 40 having shallower recesses 48 and more flutes 46 may be employed for smaller seeds. Other parameters such as flute pitch (i.e., angle relative to a longitudinal axis) and flute angle (i.e., angle relative to a radial axis) may also be particularly selected based on seed type, for example.

Thus, the actuation of the meter roller 40 may be based upon an expectation that a certain amount of seeds are in the seed meter 24. For example, when less than the expected amount of seeds is present in the seed meter 24, each recess 48 may hold less seeds. As such, each rotation of the meter roller 40 may output less seeds into the air stream 36, thereby increasing seed spacing and/or decreasing amount of seeds deposited undesirably.

As described above, multiple rows of ground engaging opener assemblies 16 may be used. In some embodiments, the seed meter 24 may include a single continuous meter roller 40. In such an embodiment, the seed distribution to each of the ground engaging opener assemblies 16 supplied by the seed meter 24 may be generally uniform.

However, in other embodiments, it may be beneficial to vary distribution rates to the ground engaging opener assemblies 16. For example, when the agricultural implement 11 is turning, ground engaging opener assemblies 16 closer to the center point of the turning circle may travel a shorter distance than ground engaging opener assemblies 16 farther from the center point. Accordingly, to maintain uniform spacing of seeds between the rows, it may be desirable for the ground engaging opener assemblies 16 closer to the center point to deposit seeds at a slower rate than the ground engaging opener assemblies 16 farther from the center point. In such embodiments, the seed meter 24 may include multiple meter rollers 40 disposed adjacent to one another. For example, each individual meter roller 40 may be used to control seed distribution to one or more of the ground engaging opener assemblies 16. Accordingly, the seed meter 24 may include 4, 5, 6, 7, 8, 9, or more independently controllable meter rollers 40.

Figure 3:
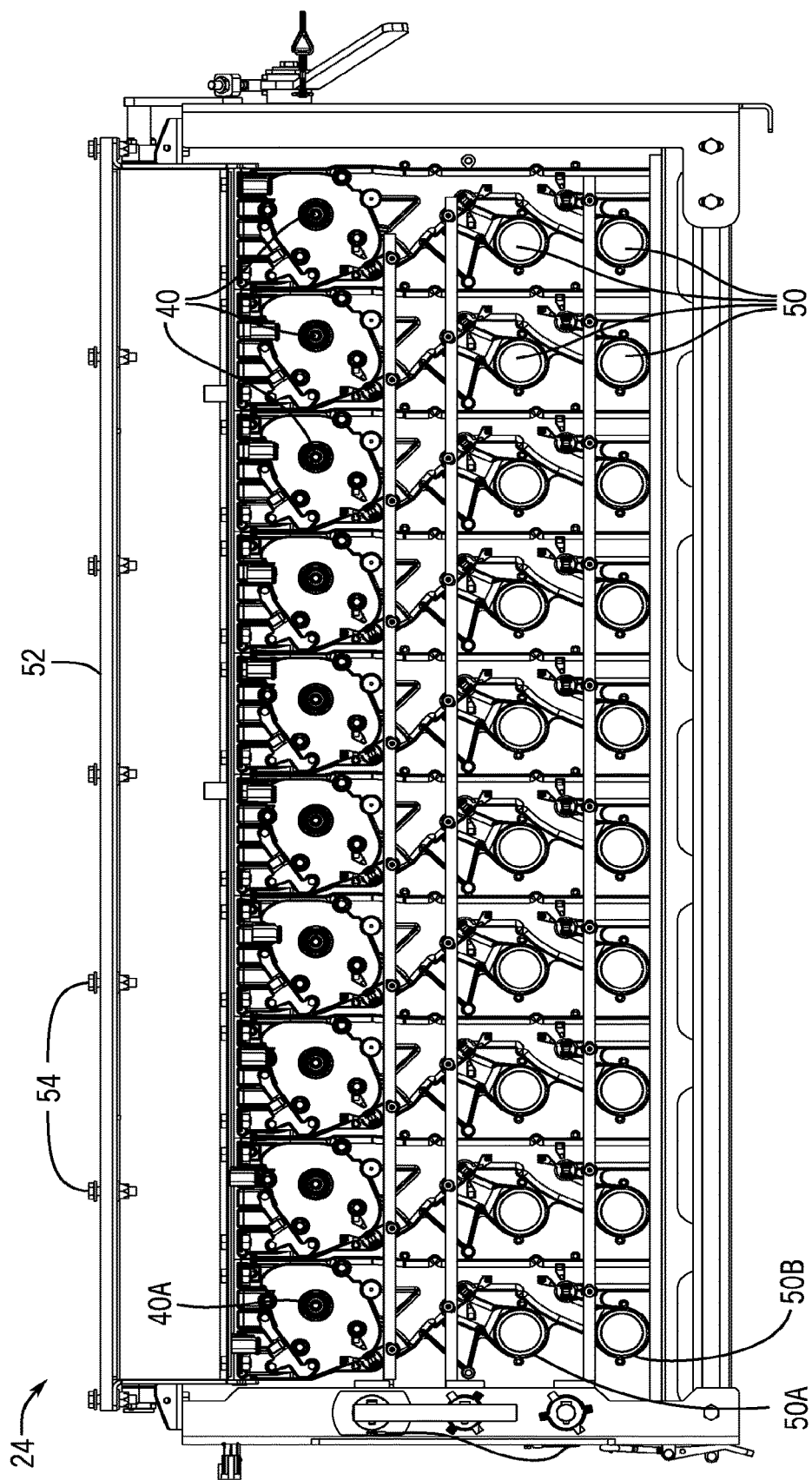
FIG. 3 is a side view of a seed meter, in accordance with an embodiment.

To help illustrate, a side view of one embodiment of a seed meter 24 with ten meter rollers 40 is shown in FIG. 3. In the depicted embodiment, each meter roller 40 may control the seed output rate through the two hose connectors 50 directly below the meter roller 40. For example, a first meter roller 40A may receive seeds from the storage tank 26 and control output of the seeds through a first hose connector 50A and a second hose connector 50B. More specifically, each hose connector 50 may be pneumatically coupled to a respective hose 34 to enable the air stream 36 to be delivered to the distribution header 18 or directly to a ground engaging opener assembly 16. As such, each of the meter rollers 40 may control the seed deposition by one or more ground engaging opener assemblies 16. In other words, the depicted seed meter 24 may be used to deposit ten or more rows of seeds into the soil.

To facilitate receiving seeds from the storage tank 26, the seed meter 24 may be secured to the storage tank 26 using a seed gate assembly 52. For example, in the depicted embodiment, the seed gate assembly 52 is secured to the bottom of the storage tank using bolts 54. Accordingly, seeds may flow from the storage tank 26, though the seed gate assembly 52, and into the seed meter 24. As such, one or more sensors (not shown) in the seed gate assembly 52 may be used to determine the seed flow rate into the seed meter 24. In some embodiments, it may be determine that clumped seeds are likely present when the seed flow rate is lower than expected.

Figure 4:
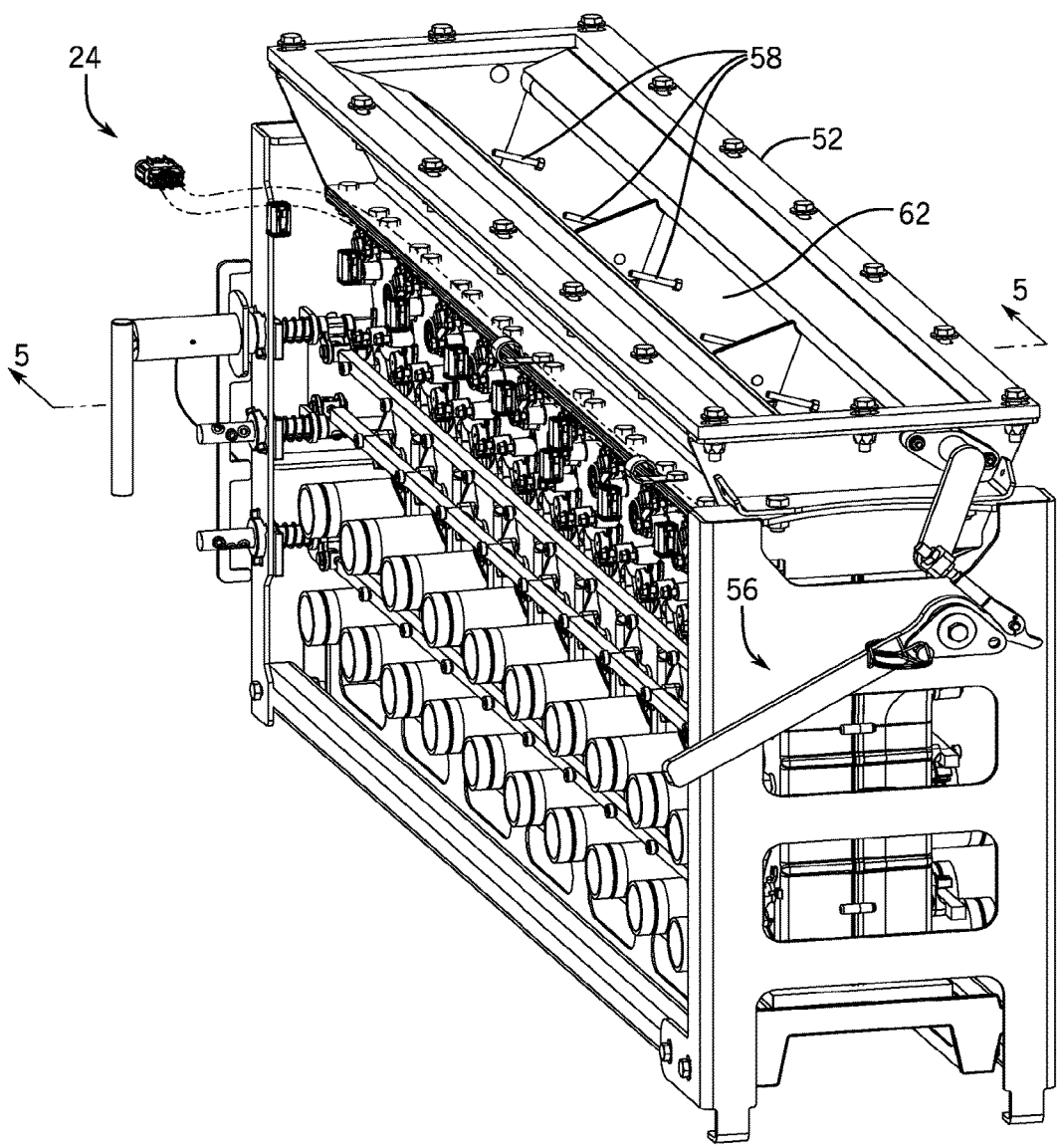
FIG. 4 is a perspective view of the seed meter of FIG. 3, in accordance with an embodiment.

Additionally, the seed gate assembly 52 may be used to control the flow of seeds from the storage tank 26 into the seed meter 24. To more clearly illustrate, a perspective view of the seed meter 24 is shown in FIG. 4. In the depicted embodiment, the seed gate assembly 52 is in a closed position. As such, the seed gate assembly 52 blocks the flow of seeds from the storage tank 26 into the seed meter 24. On the other hand, when the seed gate assembly 52 is in an open position, a flow path may be formed to enable seeds to flow from the storage tank 26 into the seed meter 24. In the depicted embodiment, the transition between the open and closed positions may be controlled by a lever 56. For example, the lever 56 may be moved in a clockwise direction to transition the seed gate assembly 52 from the closed position to the open position. Additionally, the lever 56 may be moved in a counter-clockwise direction to transition the seed gate assembly 52 from the open position to the closed position.

Additionally, in the depicted embodiment, the seed gate assembly 52 includes multiple seed agitators 58 disposed along the longitudinal extent of the seed gate assembly 52. More specifically, each seed agitator 58 may extend perpendicularly from a surface of the gate barrier 62. In fact, in some embodiments, the seed agitators 58 may extend into the storage tank 26 as the gate barrier 62 is moved to close the seed gate assembly 52. As such, the seed gate assembly 52 may be transitioned into the closed position to facilitate dislodging clumped seeds in the storage tank 26.

Figure 5:
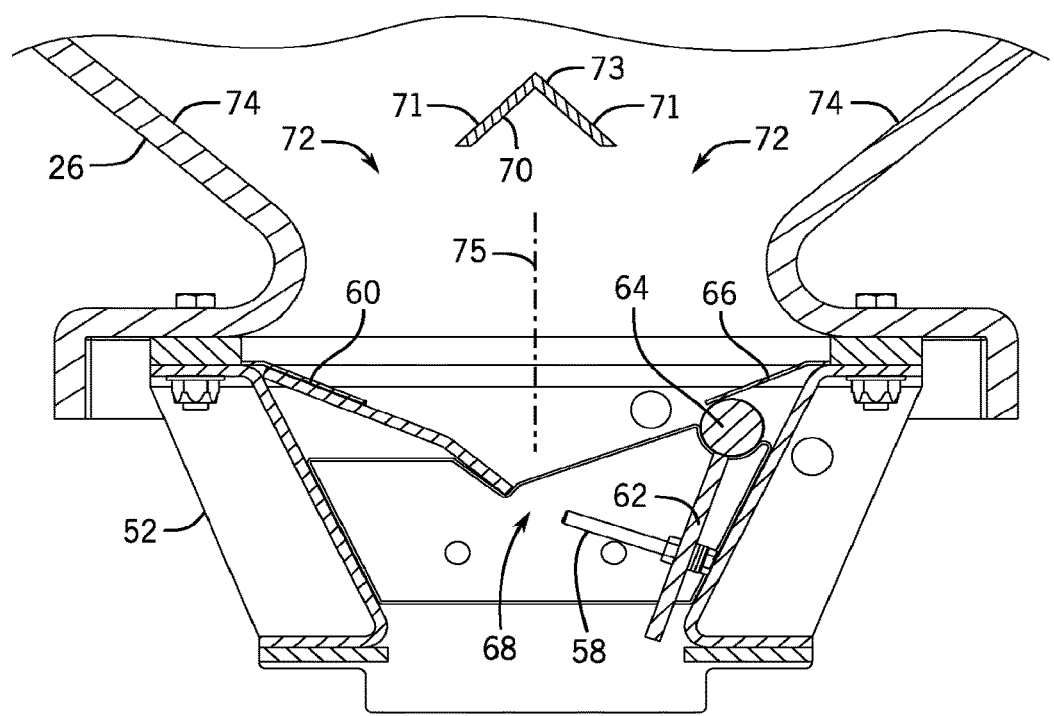
FIG. 5 is a cross-sectional view of a storage tank and a seed gate assembly, in which the seed gate is in an open position, in accordance with an embodiment.
Figure 6:
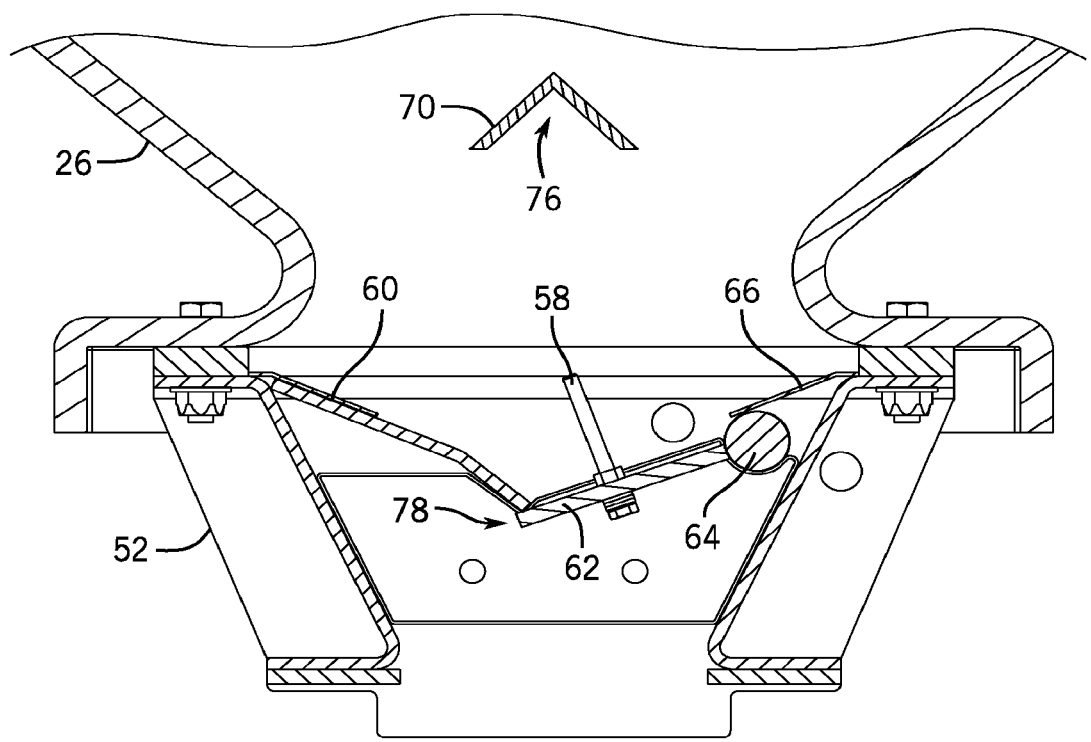
FIG. 6 is a cross-sectional view of the storage tank and the seed gate assembly of FIG. 5, in which the seed gate is in a closed position, in accordance with an embodiment.

As described above, to further reduce the possibility of clumped seed in the storage tank 26, an umbrella seed deflector may be positioned directly above the seed gate assembly. To more clearly illustrate, a cross-sectional view of the seed gate assembly 52 coupled to the storage tank 26 taken along the 5-5 lines is shown in FIGS. 5 and 6. More specifically, FIG. 5 shows the seed gate assembly 52 in the open position and FIG. 6 shows the seed gate assembly 52 in the closed position.

In the depicted embodiment, the seed gate assembly 52 includes the seed agitator 58, a gate seed deflector 60, a gate barrier 62, a hinge 64, and a hinge seed deflector 66. In the depicted embodiment, the gate barrier 62 may rotate about the hinge 64 to transition the seed gate assembly 52 between the open position and the closed position.

As depicted, when the gate barrier 62 is in the open position, a flow path 68 is formed along the gate seed deflector 60 and the gate barrier 62, which may enable seeds to flow from the storage tank 26 into the seed meter 24. Additionally, an umbrella seed deflector 70 is positioned above the flow path 68. As used herein, the term "umbrella seed deflector" is intended to describe any deflector that guides seeds away from flowing directly downward through the flow path 68 along a vertical axis, which may cause seeds to enter the flow path 68 at an angle and/or may reduce seed concentration in the flow path 68.

For example, in the depicted embodiment, the umbrella seed deflector 70 is formed with two flat pieces 71 that extend longitudinally through the storage tank 26. Additionally, the two flat pieces 71 are joined to form a point 73, which faces away from the seed meter 24. In the depicted embodiment, the angle between two flat pieces 71 is approximately 90 degrees. However, in other embodiments, the angle may be approximately 60 degrees, 76 degrees, 105 degrees, 120 degrees, or 150 degrees. As such, the two flat pieces 71 may guide the seed flow around the umbrella seed deflector 70. More specifically, in the depicted embodiment, the umbrella seed deflector 70 guides seed flow through angled flow paths 72 formed along the storage tank walls 74. Thus, when the seeds flow out of the storage tank 26, the seeds are traveling in an angled direction relative to the vertical axis 75 instead of directly straight down.

In this manner, the concentration of seeds in the flow path 68 may be reduced. For example, in some embodiments, a void 76 shown in FIG. 5 may be created directly underneath the umbrella seed deflector 70. More specifically, since seeds generally flow in a downward direction (e.g., due to gravity), the umbrella seed deflector 70 may create the void 76 by blocking seed flow above the void 76.

Additionally, in some embodiments, the umbrella seed deflector 70 may be used to control seed flow into the flow path 68. More specifically, the umbrella seed deflector 70 may be used so that the seed flow rate into the flow path 68 approximately equal to the seed flow rate out from the flow path 68, which may reduce the possibility of seed buildup in the flow path 68. As such, contact (e.g., contact area, number of contacts, etc.) between seeds while in the flow path 68 may be reduced, thereby reducing the possibility of seeds clumping together, e.g., across the seed gate assembly 52. Furthermore, the seed pressure caused by the weight of the seeds against the seed gate assembly 52 may be reduced.

The seed flow rate into the flow path 68 may be at least partially based on the size of the angled flow paths 72 in relation to the size of the seeds. In the depicted embodiment, the size of the angled flow paths 72 is dependent at least on the size of the umbrella seed deflector 70. For example, when the umbrella seed deflector 70 is larger, the size of the angled flow paths 72 may be reduced, thereby reducing the seed flow rate into the flow path 68. On the other hand, when the umbrella seed deflector 70 is smaller in size, the size of the angled flow paths 72 may be increased, thereby increasing the seed flow rate into the flow path 68. In fact, in some embodiments, the umbrella seed deflector 70 may be selectively replaced, for example, to account for different seed sizes or to change the seed flow rate into the flow path 68.

In addition to reducing the possibility of clumped seeds, the decreased concentration of seed in the flow path 68 may also facilitate operation of the seed gate assembly 52. More specifically, to move the gate barrier 62 toward the closed position, seeds in the path of the movement of the gate barrier 62 may be displaced. To help illustrate, the gate barrier 62 in the closed position is shown in FIG. 6. As depicted, when the gate barrier 62 is in the closed position, a junction 78 is formed between the gate seed deflector 60 and the gate barrier 62, which may block the flow of seeds from the storage tank 26 into the seed meter 24. Accordingly, to move the gate barrier 62 from the open position to the closed position, seeds present in the flow path 68 may be displaced. More specifically, the gate barrier 62 may guide a portion of seeds in the flow path 68 into a gap behind the gate seed deflector 76 and a portion of the seeds back into the storage tank.

The reduced concentration of seeds in the flow path 68 may improve the ease and responsiveness with which the gate barrier 62 is closed. More specifically, since the amount of seeds flowing through the flow path 68 is reduced by the umbrella seed deflector 70, the gate barrier 62 may displace a fewer number of seeds as it moves toward the closed position. Additionally, since more space is present between the seeds in the flow path 68 due to reduced seed density, the gate barrier 62 may more easily displace the seeds. Furthermore, the void 76 may provide addition open space in the storage tank 26 for the gate barrier 62 to displace seeds as it moves toward the closed position. In this manner, the ease and responsiveness with which the gate barrier 62 is closed may be improved.

In addition to the use of the umbrella seed deflector 70, the possibility of seed clumping may further be reduced because the gate seed deflector 60, the hinge seed deflector 66, and the gate barrier 62 are oriented in a downward sloping angle relative to the vertical axis. As such, the seeds may flow in a laterally inward direction (e.g., through the flow path 68 and/or toward the junction 78). In this manner, the likelihood of seeds becoming trapped and clumping, for example along the hinge 64, may be reduced.

Moreover, the downward sloping angles of the gate seed deflector 60, the hinge seed deflector 66, and the gate barrier 62 may facilitate opening and closing of the seed gate assembly 52. As described above, when the seed gate assembly 52 is in the closed position, the seeds may be guided toward the junction 78. In other words, the seeds may be guided toward a location at which the flow path 68 will be formed when the gate barrier is open. Additionally, since the junction 78 is formed at an angle, instead of as a flat surface, the possibility of seed clumping caused by the junction 78 may be reduced. Thus, as the seed gate assembly 52 transitions from the closed position to the open position, un-clumped (e.g., separated) seeds may begin to flow through the flow path 68.

As described above, the umbrella seed deflector 70 may improve operation of the seed meter 24 (e.g., by reducing seed clumping) due to its ability to guide seeds into the flow path 68 at an angle relative to the vertical axis and to reduce seed concentration in the flow path 68. Accordingly, in some embodiments, the umbrella seed deflector 70 may be stationarily coupled to the storage tank 26 in an upright orientation. As used herein, the "upright orientation" is intended to describe the orientation depicted in FIGS. 5 and 6.

In other embodiments, the umbrella seed deflector 70 may be adjustable to further improve operation of the seed meter 24. For example, the size of the umbrella seed deflector 70 may be adjusted (e.g., via operator control or automatic control) to control seed flow out of the storage tank 26 into the flow path 68 and/or the size of the void 76 created. Additionally, in further embodiments, the umbrella seed deflector 70 may be movably coupled to the storage tank 26.

Figure 7:
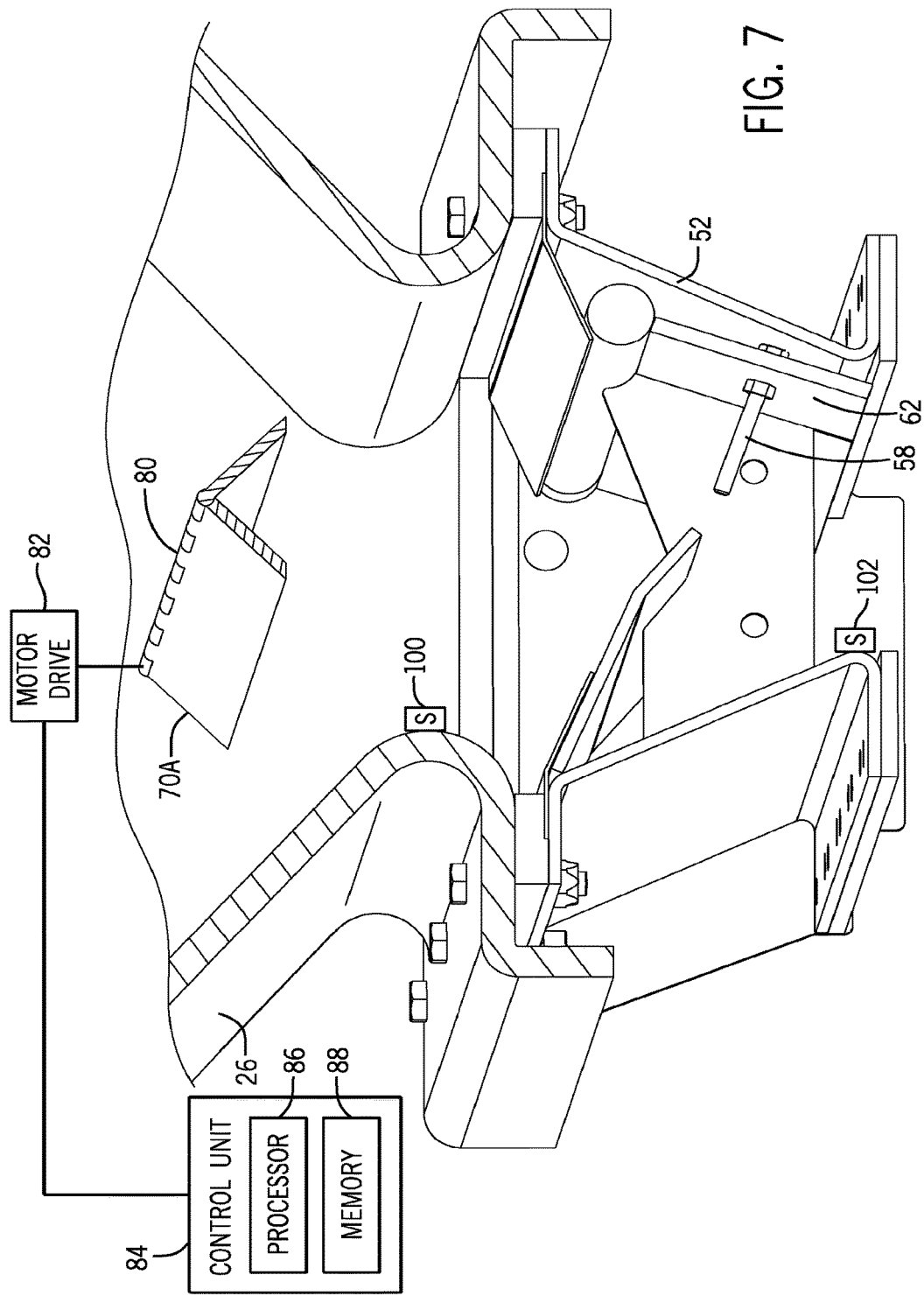
FIG. 7 is a cross-sectional perspective view of the storage tank and the seed gate assembly of FIG. 5 with a movable seed deflector, in accordance with an embodiment.

To help illustrate, an embodiment of a movable umbrella seed deflector 70A is shown in FIG. 7. As depicted, the umbrella seed deflector 70A is movably coupled to the storage tank 26 by a hinge 80, about which the umbrella seed deflector 70 may rotate. In some embodiments, a motor drive 82 may be coupled to the hinge 80 to actuate the umbrella seed deflector 70A as desired.

Generally, when the umbrella seed deflector 70A rotates, seeds in the storage tank 26 may be agitated (e.g., displaced). Accordingly, the umbrella seed deflector 70A may be actuated to dislodge clumped seeds in the storage tank 26. In fact, the umbrella seed deflector 70A may be actuated in varying control schemes. For example, in some embodiments, the umbrella seed deflector 70A may be periodically actuated (e.g., every 30 seconds). In other embodiments, the umbrella seed deflector 70A may be continuously actuated, for example, using an electric motor and an offset linkage to oscillate the umbrella seed deflector 70A up to 30 degrees back and forth during seeding. In still further embodiments, the umbrella seed deflector 70A may be actuated when clumped seeds are detected.

Additionally, since the umbrella seed deflector 70A is movable, its orientation may vary from the upright orientation, as shown in FIGS. 5 and 6. However, as described above, the upright orientation of the umbrella seed deflector 70A may improve the ease and responsiveness with which the seed gate assembly 24 is closed. As such, in some control schemes, the umbrella seed deflector 70A may be positioned in its upright position as the gate barrier 62 moves toward the closed position.

To facilitate implementing the varying control schemes, a control unit 84 may be included to control operation of the motor drive 82. For example, the control unit 84 may instruct the motor drive 82 when to actuate the umbrella seed deflector 70A, how far to rotate the umbrella seed deflector 70A, how fast to rotate the umbrella seed deflector 70A, and the like. Accordingly, the control unit 84 includes a processor 86 and memory 88. In some embodiments, the processor 86 may include one or more general purpose processors, one or more application specific integrated circuits, one or more field programmable gate arrays, or the like. Additionally, the memory 88 may be any tangible, non-transitory, computer readable medium that is capable of storing instructions executable by the processor 86 and/or data that may be processed by the processor 86. In other words, the memory 88 may include volatile memory, such as random access memory, or non-volatile memory, such as hard disk drives, read only memory, optical disks, flash memory, and the like.

Figure 8:
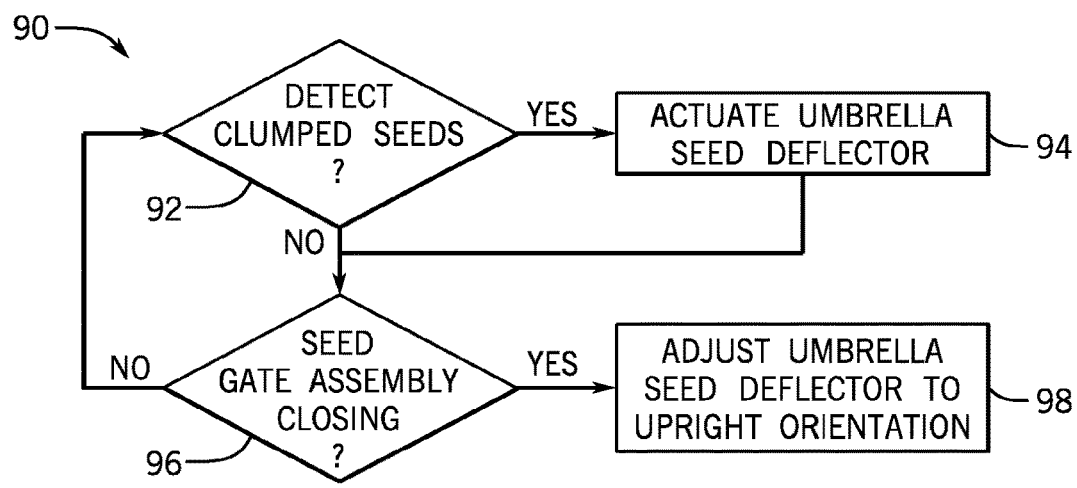
FIG. 8 is a flow diagram of a process for actuating the seed deflector, in accordance with an embodiment.

One embodiment of a process 90 that may be implemented by the control unit 84 to control the umbrella seed deflector 70A is shown in FIG. 8. Generally, the process 90 includes detecting whether clumped seeds are present (decision block 92) and actuating the umbrella seed deflector when the clumped seeds are detected (process block 94). Additionally, the process 90 includes detecting whether the seed gate assembly is closing (decision block 96) and adjusting the umbrella seed deflector to the upright orientation when the seed gate assembly is closing (process block 98). In some embodiments, one or more steps in the process 90 may be implemented by instructions stored on a tangible, non-transitory, computer readable medium, such as the memory 88, and executable by processing circuitry, such as the processor 86.

Accordingly, the control unit 84 may determine whether seed clumping is present in the storage tank 26 (decision block 92). In some embodiments, one or more sensors 100 may be disposed in the storage tank 26, the seed gate assembly 52, the seed meter 24, or any combination thereof, and may be communicatively coupled to the control unit 84. More specifically, the sensors 100 may be positioned to determine a flow rate of seeds flowing into the seed meter 24. Thus, the control unit 84 may determine that clumped seeds are likely present when the flow of seeds is lower than expected. In some embodiments, the control unit 84 may notify an operator of the flow rate with a visual display, or may notify the operator of a possibility of clumped seed with a visual or auditory indication.

When clumped seeds are detected, the control unit 84 may instruct the motor drive 82 to actuate the umbrella seed deflector 70A (process block 94). More specifically, the control unit 84 may instruct the motor drive 82 when to actuate the umbrella seed deflector 70A, how far to rotate the umbrella seed deflector 70A, how fast to rotate the umbrella seed deflector 70A, and the like, to agitate the seeds in the storage tank 26.

Additionally, the control unit 84 may determine when the seed gate assembly 52 is closing (decision block 96). In some embodiments, one or more sensors 102 may be included in the seed gate assembly 52 to detect motion of the gate barrier 62 and may be communicatively coupled to the control unit 84. Thus, when the gate barrier 62 is in the open position, the control unit 84 may determine that the seed gate assembly 52 is closing when the gate barrier 62 begins to move (e.g., toward the closed position).

When the seed gate assembly is closing, the control unit 84 may instruct the motor drive 82 to adjust the umbrella seed deflector 70A to the upright orientation (process block 98). More specifically, in some embodiments, the control unit 84 may determine the difference between the current orientation of the umbrella seed deflector 70A and the upright orientation, e.g., via an angle sensor, such as a potentiometer. The control unit 84 may then instruct the motor drive 82 to rotate the umbrella seed deflector 70A accordingly.

As such, the umbrella seed deflector 70A may be actuated to reduce the possibility of seed clumping as well as to improve the ease and responsiveness with which the seed gate assembly 52 may be closed. However, as can be appreciated, the motor drive 82 may consume energy to actuate the umbrella seed deflector 70A. In some embodiments, it may be possible to manually actuate the umbrella seed deflector 70A. For example, a lever may be directly coupled to the hinge 80 to enable an operator to manually actuate the umbrella seed deflector 70 when desired. In further embodiments, the actuation of the umbrella seed deflector 70 may be indirectly controlled, for example, by the umbrella seed deflector 70 to the gate barrier 62.

Figure 9:
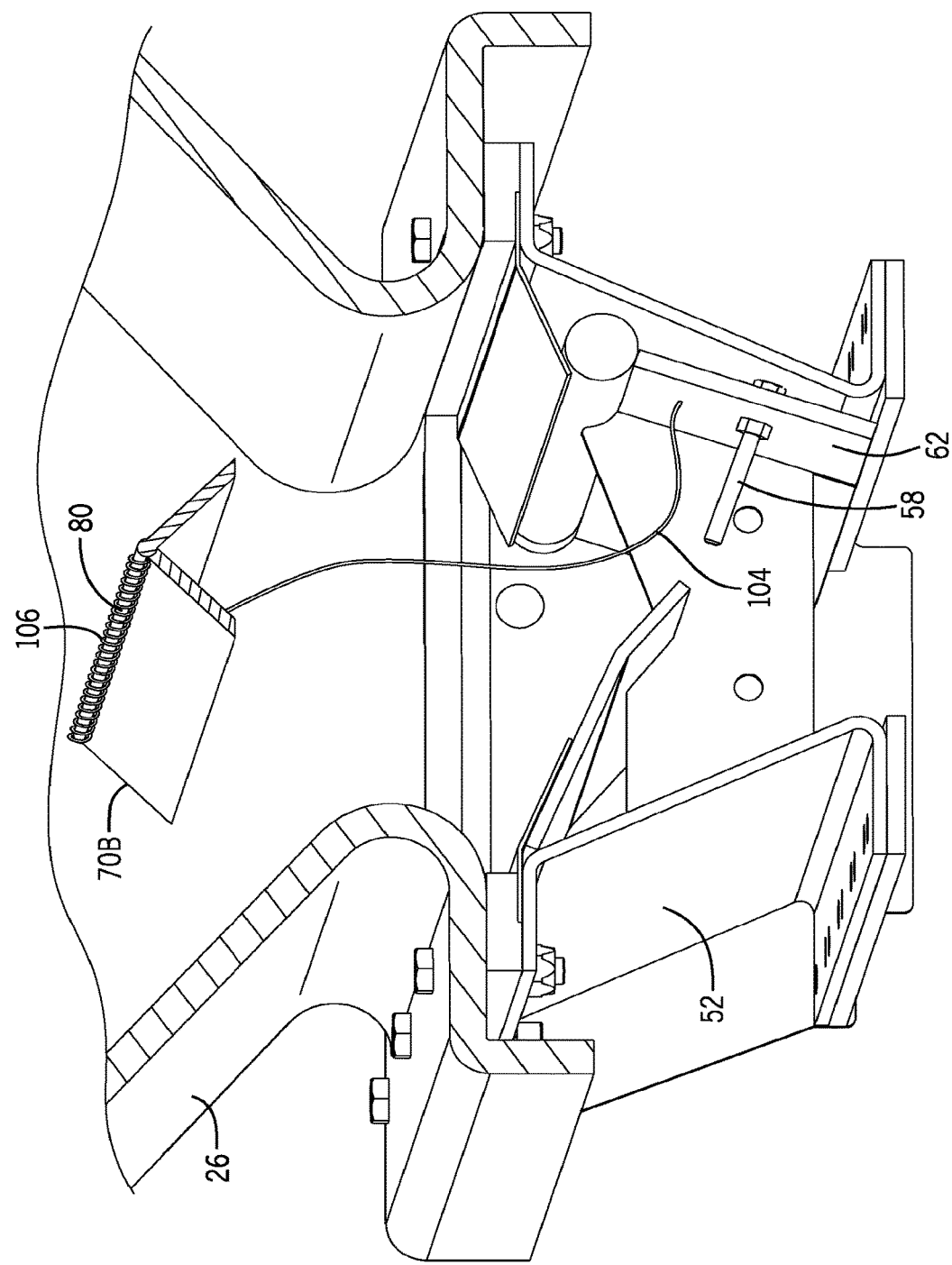
FIG. 9 is a cross-sectional perspective view of the storage tank and the seed gate assembly of FIG. 5 with an alternative movable seed deflector, in accordance with an embodiment.

To help illustrate, an embodiment of a movable umbrella seed deflector 70B is shown in FIG. 9. As depicted, one edge of the umbrella seed deflector 70B is connected to the gate barrier 62 by a cable 104 (e.g., a wire or a chain). Thus, movement of the umbrella seed deflector 70B may be directly tied to the movement of the gate barrier 62. For example, when the gate barrier 62 is moved from the closed position to the open position, the gate barrier 62 may pull on the umbrella seed deflector 70B, causing the umbrella seed deflector 70B to actuate in a first direction (e.g., rotate counter-clockwise).

Additionally, as depicted, the umbrella seed deflector 70B is coupled to the hinge 80 with a torsional spring 106. More specifically, as the umbrella seed deflector 70B is actuated by the opening of the gate barrier 62, rotational energy may be stored in the torsional spring 106. Thus, when the gate barrier 62 is moved to the closed position, the rotational energy stored in the torsional spring 106 may be released, thereby actuating the umbrella seed deflector 70B in an opposite direction (e.g., rotate clockwise).

As such, the umbrella seed deflector 70B may actuate and displace seeds each time the gate barrier 62 is moved. In fact, this may enable the umbrella seed deflector 70B to work in unison with the seed agitator 58 on the gate barrier 62 to dislodge clumped seeds. For example, the gate barrier 62 may be repeatedly moved from the open position, to the closed position, and back to the open position to enable the seed agitators 58 and the umbrella seed deflector 70B to dislodge seed clumps.

Accordingly, embodiments described herein may provide the technical benefit of improving consistency of seed distribution in a planting system. More specifically, an umbrella seed deflector may be included above a flow path, which extends from a seed storage tank to a seed meter that controls seed distribution. In some embodiments, the umbrella seed deflector may guide seeds into the flow path at an angle relative to a vertical axis to reduce the concentration of seeds in the flow path, which may improve the ease and responsiveness with which a seed gate assembly may be closed and/or which may reduce the possibility of the flow path being obstructed by clumped seeds. Additionally, in some embodiments, the umbrella seed deflector may be actuated to agitate (e.g., displace) seeds, thereby further reducing the possibility of seeds clumping.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A seed planting system, comprising:
a seed gate assembly configured to be disposed between a seed storage tank and a seed meter, wherein the seed gate assembly comprises:
a gate barrier configured to control seed flow through a flow path from the seed storage tank into the seed meter by moving between an open position and a closed position; and
a first seed agitator extending substantially perpendicularly from a surface of the gate barrier; and
a seed deflector positioned directly above the flow path and coupled to the gate barrier by a cable, wherein the cable is configured to actuate the seed deflector as the gate barrier moves;
wherein the seed deflector and the first seed agitator are configured to dislodge a clump of seeds in the seed storage tank as the gate barrier moves from the open position toward the closed position.

2. The seed planting system of claim 1, comprising a torsional spring coupled to the seed deflector, wherein the torsional spring is configured to store rotational energy as the seed deflector is actuated by the gate barrier, and to release the rotational energy as the gate barrier moves toward the closed position.

3. The seed planting system of claim 1, wherein the first seed agitator is configured to extend into the seed storage tank as the gate barrier moves toward the closed position to dislodge the clump of seeds.

4. The seed planting system of claim 1, wherein the seed deflector is configured to rotate in a first direction as the gate barrier moves toward the open position, and to rotate in a second direction, opposite the first direction, as the gate barrier moves toward the closed position.

5. The seed planting system of claim 1, wherein the seed gate assembly comprises a second seed agitator extending substantially perpendicularly from the surface of the gate barrier, and the second seed agitator is configured to extend into the seed storage tank as the gate barrier moves toward the closed position to dislodge the clump of seeds.

* * * * *